Patented Nov. 25, 1952

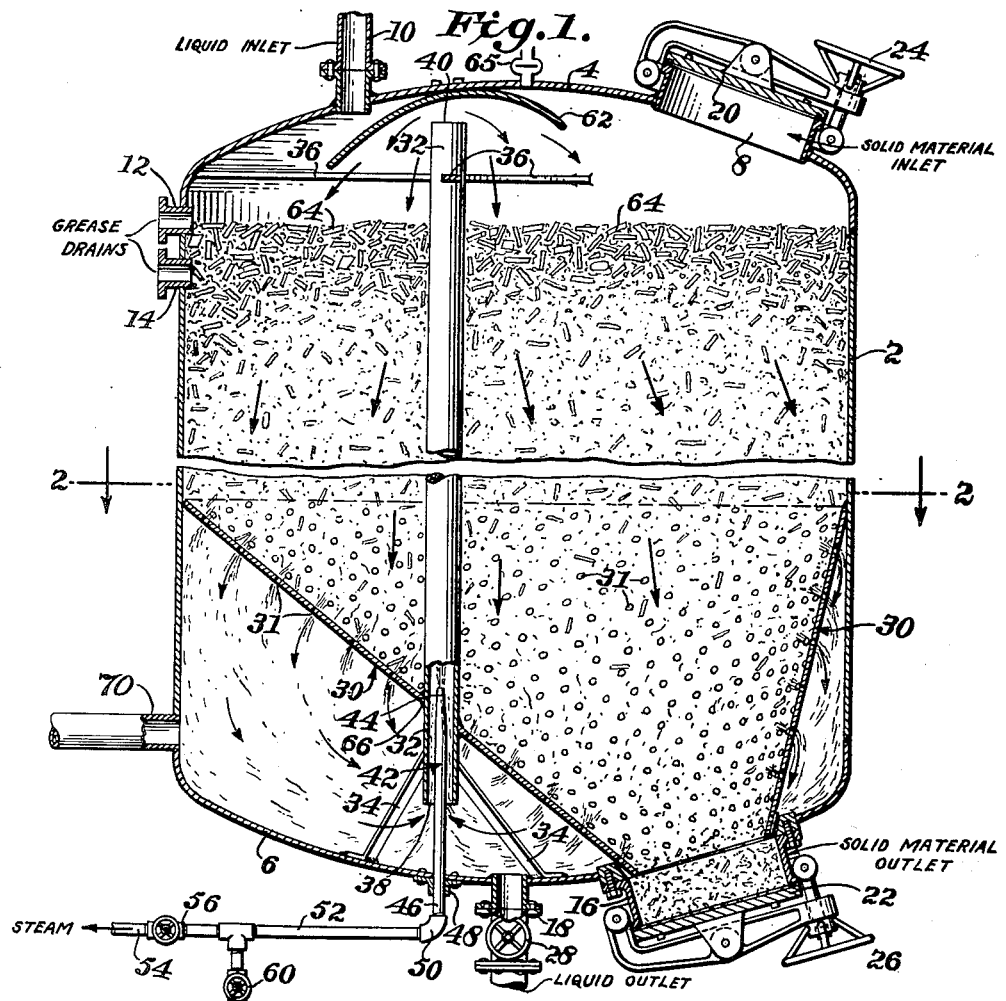
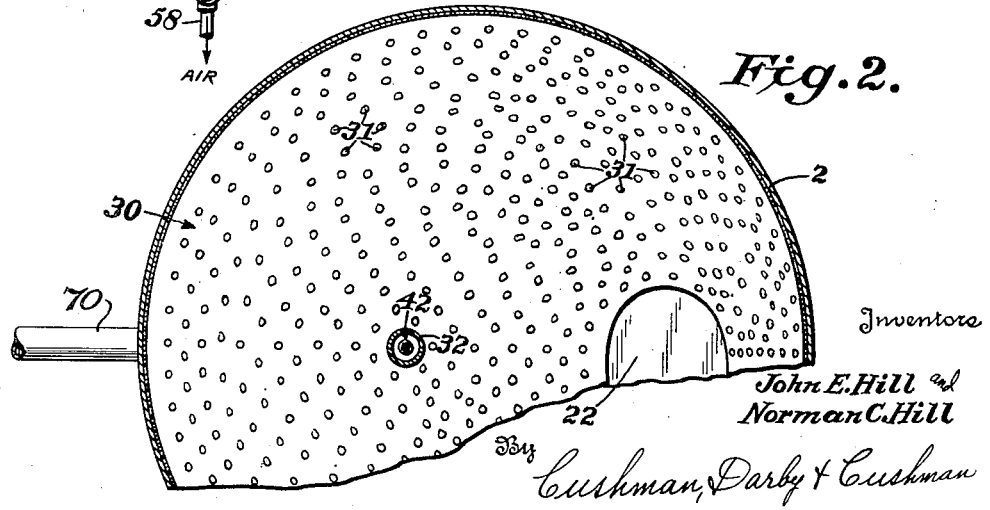

2,619,413

UNITED STATES PATENT OFFICE 2,619,413

APPARATUS FOR THE MANUFACTURE OF GLUE AND GELATINE

Norman C. Hill and John E. Hill, Akron, Ohio; said John E. Hill assignor to said Norman C. Hill Application December 18, 1947, Serial No. 792,516

6 Claims. (Cl. 23—290.5)

This invention relates to apparatus for use in the manufacture of glue and gelatine. More particularly, it is concerned with improvements in the apparatus used for cooking glue or gelatine out of collagen containing material, such as bones and hides.

Glue and gelatine are chemically similar in composition, and, actually, glue can be considered to be gelatine of an impure form. Consequently, the same general procedural steps and the same general apparatus are used for the production of either of these two products.

The source of glue or gelatine is collagen containing materials, such as bones, hides or ossein, from which the glue or gelatine is obtained by a procedure which is sometimes referred to as the cooking operation and at other times is referred to as an extraction process, a hydrolysis process or other similar terms used by the trade. For the sake of simplicity, this particular general operation will be referred to herein as a cooking step.

The cooking of collagen containing materials is generally conducted in a pressure vessel or tank designed to hold the collagen containing material and permit this material to be contacted with hot, aqueous, cooking liquors. The operation is begun by charging the pressure vessel with collagen containing material which has been sufficiently subdivided to permit the material to be efficiently contained within the vessel without unduly preventing the cooking liquors from percolating therethrough. The particles of collagen containing material are then subjected to one or more cold water washes which serve to remove foreign substances, such as blood and other cold water soluble materials from the collagen containing particles. This washing operation may be dispensed with if glues of only inferior quality are required.

After the particles have been sufficiently washed, they are drained free of the wash water and the pressure vessel is filled to an appropriate level with hot water. The collagen containing material inlet ports of the pressure vessel are then closed and live steam is introduced directly into the tank, or steam is circulated through a heating jacket, as required in order to maintain the cooking liquor temperature at the desired level throughout the entire cooking process. At the completion of the cooking step, the grease layer which forms upon the surface of the cooking liquor is drained off after which the cooking liquor, which now comprises an aqueous solution of glue or gelatine, is removed from the cooking vessel and conveyed to the subsequent sections of the manufacturing plant.

The collagen containing material in the cooking vessel is subjected to repeated cooking steps which are continued for as many times as is necessary to convert as much of the collagen contained therein to glue or gelatine as is economically feasible. In common practice, prior to the present invention, each cooking step generally required up to fifteen minutes in the case of hides, and up to one hour in the case of bones. The total time consumed for the entire group of cooking steps in order to completely convert the collagen from a particular batch of bones or hides is generally in the neighborhood of up to twelve hours where the cook charge is hides or ossein, and up to fourteen hours or more where the cook charge is animal bones.

It is a well-known fact that, if an aqueous solution of gelatine or glue is maintained at a substantially elevated temperature, such as the temperatures prevailing during the cooking operations described above, the glue or gelatine is degraded and loses a portion of its desired property referred to as body or gel strength. Consequently, it is necessary, in order to produce a satisfactory glue or gelatine product, that the cooking liquors shall be maintained at the elevated temperature for only a short time and that the final evaporation be completed in the shortest possible time. This reduction in the amount of time which can be given to any individual cooking step results in the production of glue and gelatine solutions in each step of relatively low concentration since the cooking steps may not be carried on sufficiently long to permit the solution to become highly concentrated. The problem of heat control and efficient contact of the cooking liquors with the collagen containing material during the cooking operation is further aggravated by the fact that, in order to make efficient use of the cooking vessel, it is necessary to rather finely subdivide the collagen material. Thus, with the bones or hides charged into the pressure vessel as subdivided particles, the cooking liquor exhibits a very great tendency to channel down the sides of the pressure vessel. This uneven distribution of cooking liquor prevents the center of the mass of particles from being heated to the required degree and the particles there from being contacted with the cooking liquor to the required extent.

It has long been recognized in the trade that, if a more efficient way of circulating the cooking liquors about the collagen containing material particles and of insuring that the middle sections of the solid mass is heated as rapidly as the surrounding portions could be found, then solutions of higher concentration of glue or gelatine could be produced in shorter periods of time with the final result that glue or gelatine products of much higher gel strength would be obtained. This would result not only because it would be unnecessary to maintain the cooking liquor at elevated temperatures for undesirable lengths of time during the cooking step, but also because less heat and shorter periods of time would be required for concentrating the glue or gelatine solutions obtained as a result of the cooking operations.

A principal object of this invention is the provision of new apparatus for use in the manufacture of glue and gelatine. Further objects include:

1. The provision of a new apparatus for circulating cooking liquor throughout the collagen containing material whereby the entire mass of the material is more uniformly heated and contacted with the cooking liquor;

2. The provision of a collagen containing material cooking apparatus which permits higher concentrations of glue or gelatine solutions to be obtained in shorter periods of time than the cooking procedures employed heretofore;

3. The provision of a glue or gelatine production apparatus which makes possible substantial savings in heat and power required for carrying out the cooking step;

4. The provision of an apparatus for use in the efficient circulation of cooking liquors in glue and gelatine manufacture involving mechanical moving parts, such as pumps, thus giving great cleanliness of operation;

Still further objects and the entire scope of applicability of this invention will become apparent from the detailed description given hereinafter, but it should be realized that the specific embodiments, as contained in this detailed description, are merely by way of illustration and that the invention is basically broader than these specific embodiments in view of the fact that various modifications and alterations within the spirit of the invention will be apparent to those skilled in the art.

The new apparatus provided by this invention can be more easily comprehended by reference to the attached drawing, in which:

Figure 1 is a vertical section through one specific form of cooking vessel utilizing the features of this invention;

Figure 2 is a transverse sectional view along the line 2—2 of Figure 1 with the collagen containing material particles contained in the vessel illustrated in Figure 1 removed.

Referring in detail to the drawing, the cooking apparatus consists of a cylindrically-shaped pressure vessel 2 provided with a dome-shaped top 4 and a dished bottom 6, both of which are welded to the sides of the vessel 2.

The vessel is provided with inlets and outlets which consist of a solid material inlet 8 and a liquid inlet 10, both fastened in the top of the vessel, such as by welding, a plurality of side entering grease drains 12 and 14, and a solid material outlet 16 and liquid material outlet 18, both located on the bottom of the vessel.

The inlet 8 and the outlet 16 are of the common manhole type employed with pressure vessels and are provided with covers 20 and 22, respectively. The covers 20 and 22 have associated therewith clamping means 24 and 26 which serve to hold the covers 20 and 22 in vapor-tight association with the pressure vessel.

The liquid outlet 18 is preferably situated in the exact center of the dished bottom 6 to insure that all of the glue or gelatine solution produced in a cooking operation will be removed at the completion of each cooking step, so as to prevent putrefication from taking place within the cooking vessel between batches. The outlet 18 is connected through a valve 28 to a glue or gelatine solution storage tank, not shown.

In the lower portion of the pressure vessel, there is located a frusto-conical partition 30 having perforations 31 therein. The apex end of the partition communicates with the solid material outlet 16, while the base end joins the inner surface of the walls 2 a substantial distance up the side of the vessel from the bottom 6. This partition 30, which may also be referred to as a perforated false-bottom, serves to hold the particles of collagen containing material suspended above the bottom 6 of the vessel and permit cooking liquor to circulate freely along the bottom portion of the vessel. The partition 30 further insures the discharge of all of the cooked solid particles from the vessel 2 through the outlet 16.

All of the portions of the apparatus described above are standard features of glue or gelatine cooking vessels. The novel features of this invention center mainly around the open end tube 32 and elements associated therewith. This tube is supported within the pressure vessel 2 in a vertical position, preferably near the center of the vessel, but not directly over the outlet 18, by means of the supports or braces 34 and 36. The braces 36 should be placed within the vessel 2 so that material charged into the vessel through the inlet 8 will not fall upon any of the braces and become lodged there to putrefy. The tube 32 is of such length that, when so positioned within the vessel, the lower open end of the tube 38 comes within a short distance of the vessel bottom 6, while the open top end of the tube comes within a short distance of the top 4. The frusto-conical partition 30 intercepts the tube 32 at a point 66 a short distance above the lower open end 38 of the tube.

There extends into the bottom open end 38 of the tube 32 a jet tube 42 which is of appreciably smaller diameter than the tube 32 and which has its jet end 44 extending a short distance into the bottom interior of the tube 32. The opposite end 46 of the tube or pipe 42 passes through the bottom 6 of the vessel and is held in vapor-tight connection therewith by means of the flange or bushing 48. The end of the jet tube 46, outside of the vessel 2, is connected by means of the elbow 50 and pipe 52 to a source of fluid, e. g., a source of steam, connected to pipe 54 through valve 56 and a source of air pressure connected through the pipe 58 and the valve 60.

At the top of the vertically positioned tube 32, there is positioned, such as by riveting or welding to the top 4, an arcuate partition or umbrella 62. The purpose of this umbrella 62 is to distribute liquid which issues from the end of the tube 32 evenly over the entire surface of the collagen containing particles 64 contained within the pressure vessel.

A small vapor escape means 65 in the top 4 of the vessel may be provided. This means 65 may be a pressure relief valve, or any other device of this type which is capable of allowing portions of vapors under predetermined pressure to escape from the vessel. The liquid outlet 10 may also be valved (not shown) to accomplish the same purpose.

With the specific features of one preferred embodiment of the apparatus of this invention described and illustrated, the mode of operation of the present invention may now be described.

The collagen material which has been subdivided to form particles of proper size for efficient charging of the pressure vessel are loaded into the vessel 2 through the inlet 8. Cold water is then introduced into the vessel through the inlet 10 and when the water level rises to a desired height, such as three-quarters of the way up the vessel, the water is caused to circulate throughout the entire mass of the collagen containing particles by forcing a stream of air at relatively high velocity, for example at twenty pounds per square inch or greater into the base of the tube 32 through the jet tube 42. Thus, air streams into the base of the tube 32 in which there is contained a minor portion of the wash water, and the combined effect of the cocurrent force of the air stream and the resultant decrease in density of the wash water portion contained in the tube 32 due to the presence of bubbles of air therein, causes the portion of wash water contained in the tube to pass up the tube 32 and to be forcibly ejected from the top open end 40 thereof. This ejected portion of water strikes the umbrella 62 and as a result, is evenly distributed over the entire top surface of the collagen particles 64. Continued ejection of air through the jet tube 42 causes further portions of the wash water to enter at the base of the tube 32, then to rise up the tube, and to be forcibly ejected at the top. As a result, efficient circulation of the wash water throughout the entire mass of the collagen containing particles 64 takes place in a fashion which is illustrated by the arrows on Figure 1. This method of producing a liquid circulation is sometimes referred to as the air-lift or fluid-lift principle.

After the wash water has been circulated about the collagen containing particles for a sufficient length of time, the valve 28 is opened and the wash water permitted to drain from the vessel through the liquid outlet 18. This washing operation is conducted with further portions of fresh cold water until substantially all of the foreign material, such as blood and other substances contained upon the collagen containing particles is removed.

After the washing operation is completed, the inlet 8 is closed by means of the cover 20 and sufficient hot water is introduced through the liquid inlet 10 to fill the vessel 2 to very near the top of the level of collagen containing particles 64. Steam is now ejected through the jet tube 42 into the tube 38 by opening the valve 58. In much the same fashion in which the cold wash water is forced to circulate throughout the vessel by the ejection of air, the steam which is ejected from the jet end 44 of the tube 42 into the tube 32 causes succeeding portions of water in the tube 32 to acquire an apparent density less than the density of liquid in the cooking vessel and to issue from the open end 40. At the same time, the latent heat contained in the steam serves to heat the water to provide the heat necessary to maintain the circulating glue or gelatine solution at the temperature required for the efficient hydrolysis and extraction of glue and gelatine from the collagen in the particles 64.

The mass of particles 64 contained in the cooking vessel 2 is rapidly and uniformly heated to the cooking temperature because firstly, the even distribution of the cooking liquor upon the entire surface of the particles 64 causes the liquor to be circulated uniformly throughout the mass of the particles, secondly, the tube 32 which becomes heated by the steam passing internally up through the tube and transfers its heat to the central portion of the collagen containing material which has been charged into the vessel. In other words, the problem of effectively heating the center portion of the collagen containing material during the cooking operation is solved by the present invention not only because the tube 32 and the fluid-lift principle associated provide for unusually good circulation of the cooking liquor, but also because the centrally positioned tube aids in transference of heat to the central portions of the mass being treated. Moreover, this tube serves to prevent the collagen containing particles from becoming unduly packed at the center of the mass and serves to keep the center of the mass open so that proper circulation of the liquor throughout the particles may take place.

By continuously venting a portion of the vapors in the vessel through the escape means 65, or valved inlet 10, fresh supplies of steam may enter the vessel even when the internal pressure approaches that of the steam pressure. Furthermore, continued venting through valve 65 aids to remove oxygen from the vessel with the result that the glue or gelatine is less degraded at cooking temperatures and a better product is obtained.

After the hot cooking liquor has been circulated by means of the ejected steam for a sufficient length of time to produce a glue or gelatine solution of adequate concentration, the hot solution is immediately withdrawn from the vessel through the outlet 18 by opening the valve 28. Thereafter, the valve 28 is closed and a fresh quantity of hot water is introduced into the vessel through the liquid inlet 10 or liquid inlet 70. The ejection of steam and circulation of cooking liquor is repeated after which the resulting glue or gelatine solution is withdrawn in the same fashion as indicated above for the first cooking step. These cooking steps are repeated until a solution of sufficient concentration of glue or gelatine can no longer be obtained from the exhausted particles charged into the vessel. At this point, the outlet 16 is opened and the exhausted particles are removed from the vessel as tankage. The entire operation is then repeated by recharging the vessel with new collagen containing material, going through the washing steps and finally the cooking steps.

Several units may be operated together in combination of three or four, introducing hot water into the lowest collagen containing batch and withdrawing the concentrated solution from the pressure vessel containing the stock with the highest collagen content. The unit may, therefore, be operated, strictly batch, semi-continuous, or as continuous group units withdrawing the "spent" vessel from the operating group for removal of the tankage (remaining residue) and continuing to extract collagen from the charges in the other units.

Substantially any solid materials which contain collagen in sufficient quantity to make possible the commercial production of hydrophilic animal protein material, i. e., glue or gelatine therefrom may be treated in accordance with this invention. Thus, green bone, country bone, ossein, horn pith, sinews, hide stock, or the like, may all be effectively cooked. However, the conditions and times required for the cooking of different materials will, of course, vary with the material which is treated. Thus, temperatures in the neighborhood of 150° F. or lower are preferred for the cooking of hides, whereas temperatures in the neighborhood of 212° to 260° F. are preferred for the cooking of bones.

The time necessary for a single cooking step also varies with the particular material which is treated. However, the required time for a given step is materially less in the cases where the present invention is employed than for operations where previous methods of cooking and liquor circulation are used, e. g., circulation of cooking liquors by means of pumps or by the simple injection of raw steam into the base of the pressure vessel. Thus, whereas up to fifteen minutes or more for each cooking step are generally required for the treatment of hides and one hour or more are generally required for each step in the cooking of animal bones, a single cooking step may be accomplished with our process in a period of a few minutes in the case of hides, and in substantially less than one hour, e. g., one-quarter hour to one-half hour, in the case of animal bones. Furthermore, since the collagen containing material is raised to cooking temperature much more rapidly by the present process than with the procedures used heretofore, it is possible to produce glue or gelatine solutions of higher concentration without appreciable loss of gel strength. Thus, while it is generally not possible to obtain glue or gelatine solution of concentration greater than 11% with procedures employed heretofore, it is possible to produce solutions of glue or gelatine of comparable gel strength from the same basic materials in concentration between 14 and 18%. Hence, this invention provides saving in the amount of time and the total heat required to evaporate and concentrate the resulting glue or gelatine solutions and, at the same time, produces final products of better quality.

While the vertical, open-end tube 32 is preferably placed in approximately the center axis of the upright cylindrical pressure vessel, it may be placed at any convenient location, either inside the pressure tank, internal thereto, or outside said pressure tank. The internal, central location is exceedingly better because of the advantages given above. Further, it should be realized that the principles and apparatus involved herein are broader than the structures specifically described above, and rather than attempt to list the numerous modifications with which we have experimented and, instead restrict the description to those which we have found to be best in practice, we define these principles and apparatus in the appended claims.

The term "gelatine material" as used in the accompanying claims is intended to cover both glue and gelatine and similar products generally referred to by this term.

This application is a continuation-in-part of our application Ser. No. 729,814, filed February 20, 1947, now Patent No. 2,517,487.

We claim:
1. Apparatus for use in the treatment of solid collagen containing material to produce an aqueous solution of gelatine material comprising a closed pressure vessel having a top-entering inlet for solid material, an outlet for solid material in the bottom, a grease drain comprising conduits located on the side of said vessel near the upper end thereof, an open end tube supported within the vessel with its open top end a short distance from the top of the vessel and its open bottom end a short distance from the bottom end of the vessel, a perforated, frusto-conical partition supported within the vessel with the open end communicating with said bottom outlet, said partition intercepting said tube above the lower end, and a jet tube adapted to eject fluid into the vessel having its jet end extending a short distance into the lower end of said first-named tube.

2. The apparatus of claim 1, wherein the vessel is provided with vapor escape valve for permitting a controlled amount of vapor in the vessel to escape during use of the vessel.

3. The apparatus of claim 1, wherein said jet tube passes through the vessel bottom for connection with an external source of steam.

4. The apparatus of claim 3, wherein an arcuate partition is positioned above the top open end of said vertical tube in order to distribute fluid ejected from said tube.

5. The apparatus of claim 4, wherein a liquid inlet pipe is located in the top of the vessel and a liquid outlet pipe is located in the bottom of the vessel.

6. Apparatus for use in the treatment of solid collagen containing material to produce an aqueous solution of gelatine material comprising a closed pressure vessel having a top-entering inlet for solid collagen containing material, an outlet for solid extracted material in the bottom, a grease drain comprising a conduit located on the side of said vessel near the upper end thereof, an open tube supported within the vessel with its open top end a short distance from the top of the vessel and its open bottom end a short distance from the bottom end of the vessel, a perforated frusto-conical partition supported within the vessel with the open end thereof communicating with said bottom outlet, said partition intercepting said open-ended tube above the lower end thereof, a jet tube which passes through the vessel bottom for connection with an external source of steam having its jet end extending a short distance into the lower end of said open-ended tube, said steam-supplied jet tube constituting substantially the only source of heat for heating the contents of said vessel.

NORMAN C. HILL.
JOHN E. HILL.

REFERENCES CITED

The following references are of record in the file of this patent:

UNITED STATES PATENTS

| Number | Name | Date |
| --- | --- | --- |
| 1,421,620 | Tunnell | July 4, 1922 |
| 1,859,497 | Buss | May 24, 1932 |
| 1,943,330 | Mitchell | Jan. 16, 1934 |